(12) United States Patent
Phillips

(10) Patent No.: US 12,189,357 B2
(45) Date of Patent: Jan. 7, 2025

(54) STATIC EDGE FINDER AND TOOL HEIGHT GAUGE FOR COMPUTER NUMERICAL CONTROL (CNC) MACHINES

(71) Applicant: Steven E. Phillips, Boylston, MA (US)

(72) Inventor: Steven E. Phillips, Boylston, MA (US)

(*) Notice: Subject to any disclaimer, the term of this patent is extended or adjusted under 35 U.S.C. 154(b) by 983 days.

(21) Appl. No.: 17/188,834

(22) Filed: Mar. 1, 2021

(65) Prior Publication Data

US 2021/0271222 A1 Sep. 2, 2021

Related U.S. Application Data

(60) Provisional application No. 62/982,893, filed on Feb. 28, 2020.

(51) Int. Cl.
*G05B 19/401* (2006.01)
*B23Q 17/22* (2006.01)

(52) U.S. Cl.
CPC ........... *G05B 19/401* (2013.01); *B23Q 17/22* (2013.01); *G05B 2219/4706* (2013.01)

(58) Field of Classification Search
CPC ................. B23Q 17/22; G05B 19/401; G05B 2219/4706
See application file for complete search history.

(56) References Cited

U.S. PATENT DOCUMENTS

| | | | | |
|---|---|---|---|---|
| 3,999,299 A * | 12/1976 | Johnson | .................... | G01B 5/25 33/642 |
| 4,429,463 A * | 2/1984 | Angell | ............... | B23Q 17/2233 33/642 |
| 5,148,608 A * | 9/1992 | Meller | .................... | G01B 7/002 33/561 |
| 5,276,975 A * | 1/1994 | Fisher | ....................... | G01B 5/25 33/630 |
| 6,796,038 B2 * | 9/2004 | Humphries | ............. | F41G 1/467 33/DIG. 21 |
| 8,499,469 B2 * | 8/2013 | Vukicevic | ................. | G01B 5/25 33/642 |
| 2006/0053643 A1 * | 3/2006 | Adrian | ................. | G01C 15/002 33/286 |
| 2007/0068020 A1 * | 3/2007 | Adrian | ............... | B23Q 17/2404 33/286 |
| 2012/0279079 A1 * | 11/2012 | Vukicevic | ................ | G01B 5/25 33/558 |

* cited by examiner

*Primary Examiner* — Shelby A Turner
*Assistant Examiner* — Yaritza H Perez Bermudez
(74) *Attorney, Agent, or Firm* — Pandiscio & Pandiscio

(57) ABSTRACT

A static edge finder for finding an edge of a workpiece loaded in a CNC machine, and tool height gauge for finding the height of a tool loaded in a CNC machine.

16 Claims, 14 Drawing Sheets

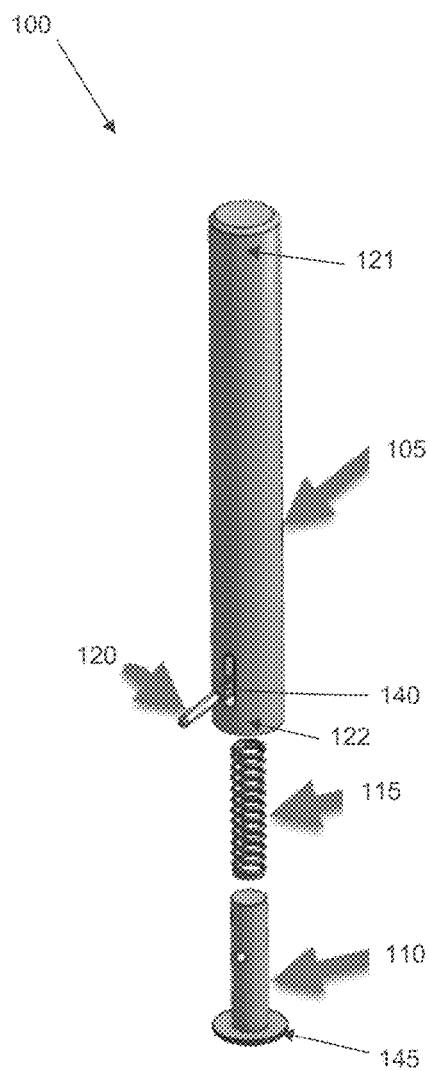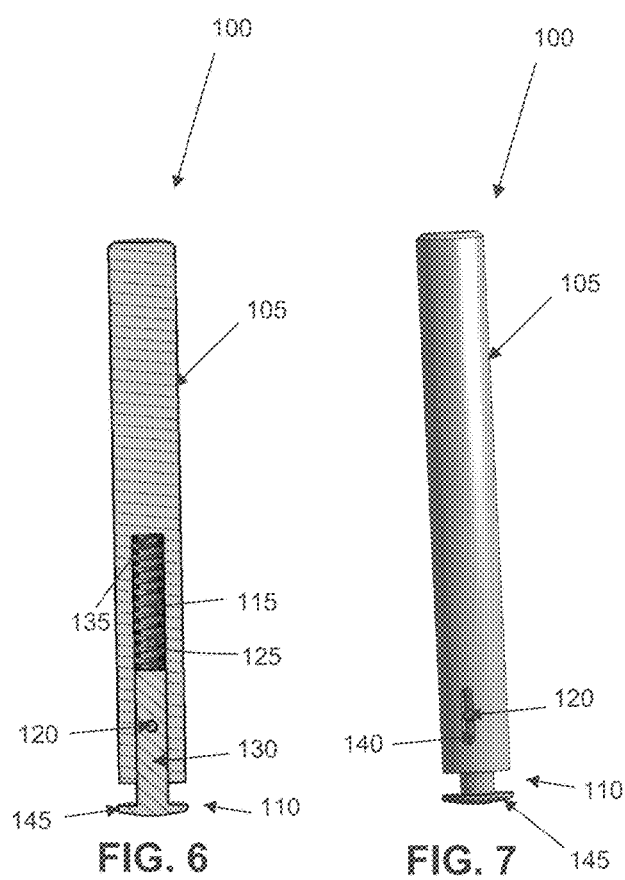
FIG. 5
FIG. 6
FIG. 7

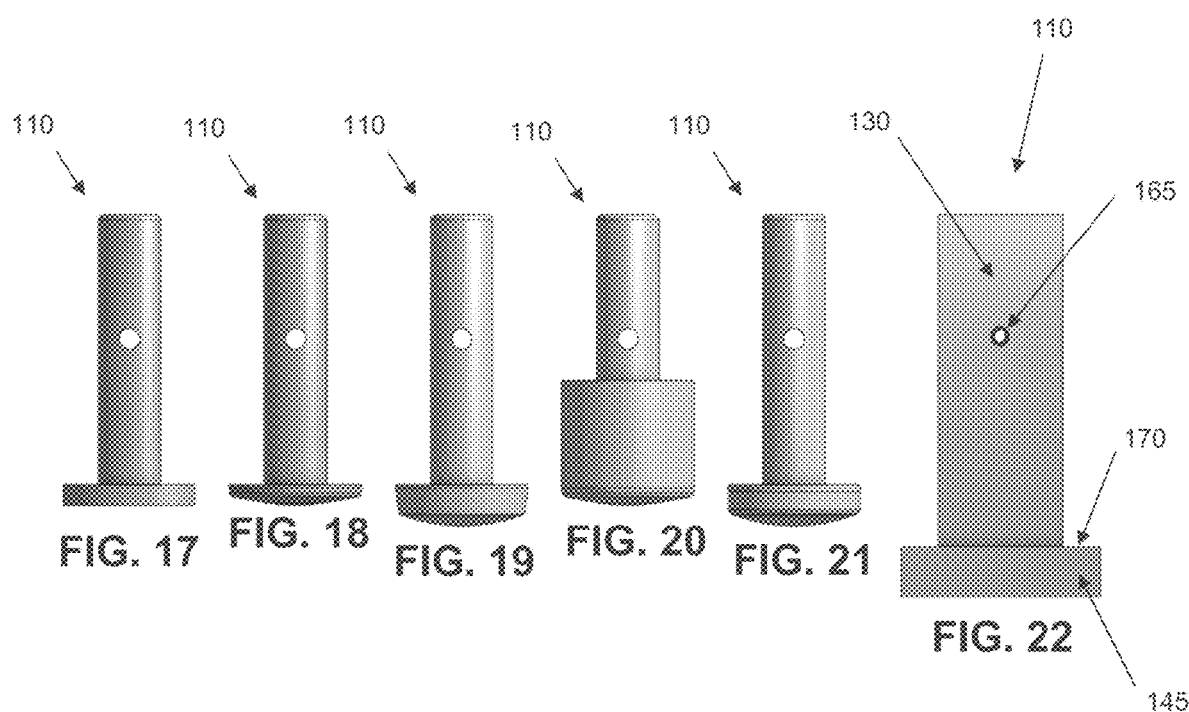

STATIC EDGE FINDER AND TOOL HEIGHT GAUGE FOR COMPUTER NUMERICAL CONTROL (CNC) MACHINES

REFERENCE TO PENDING PRIOR PATENT APPLICATION

This patent application claims benefit of prior U.S. Provisional Patent Application Ser. No. 62/982,893, filed Feb. 28, 2020 by Steven E. Phillips for STATIC EDGE FINDER AND TOOL HEIGHT GAUGE FOR COMPUTER NUMERICAL CONTROL (CNC) MACHINES, which patent application is hereby incorporated herein by reference.

FIELD OF THE INVENTION

This invention relates to Computer Numerical Control (CNC) machines in general, and more particularly to edge finders and tool height gauges for use with CNC machines.

BACKGROUND OF THE INVENTION

CNC machines are electro-mechanical devices which are used to transform a stock piece of material (i.e., a workpiece) into a finished product (e.g., by machining, drilling, etc.). CNC machines typically comprise a work enclosure for isolating the workpiece from the operator (and from bystanders) while the workpiece is worked. Doors allow access into the work enclosure, e.g., for the insertion and removal of workpieces, for supplying tools to the CNC machine and removing tools from the CNC machine, etc.

For safety reasons, all new CNC machines come with door interlocks that lock the doors of the work enclosure while the spindle of the CNC machine is running, thereby ensuring that operators (and bystanders) are shielded from the cutting action taking place in the work enclosure during operation of the CNC machine. If the CNC machine's safety switches are tampered with, the company could be severely fined.

Finding the Edges of Workpieces

In many cases, it is necessary to identify the edges of a workpiece when the workpiece is positioned in the CNC machine. The traditional way of doing this is to use a conventional edge finder 5 (see FIGS. 1 and 2) that is loaded into the spindle 10 of the CNC machine and rotates with the spindle of the CNC machine. The conventional edge finder 5 generally comprises an upper portion 15 which is loaded into the spindle 10 of the CNC machine, and a lower portion 20 which is normally spring-biased into an eccentric position (i.e., so that the center axis 25 of the lower portion 20 is eccentric to the center axis 27 of the upper portion 15). While spinning, the edge finder 5 encounters an edge 30 of a workpiece 35 and the lower portion 20 of the edge finder is forced laterally, so that the center axis 25 of the lower portion 20 is moved into alignment with the center axis 27 of the upper portion 15 of the edge finder (and hence into alignment with the center axis 40 of the spindle 10), thereby indicating to the operator that the edge finder 5 is flush with the edge 30 of the workpiece 35. At this point the spindle 10 of the CNC machine is raised and the location of the spindle axis 40 is recorded. Half the diameter of the lower portion 20 of edge finder 5 is then added to, or subtracted from, the center axis 40 of the spindle 10 so as to identify the edge 30 of the workpiece 35. However, with the door of the work enclosure closed, it is very difficult to see this happen, which makes edge detection via a conventional edge finder slow and inconvenient.

A more modern (but much more expensive) way to locate the edge of the workpiece is to use an electronic spindle probe 45 or other electronic device. See FIGS. 3 and 4. These are expensive, or may require batteries, and are very delicate.

As will hereinafter be discussed, the present invention provides a novel static edge finder for finding the edges of workpieces which overcomes the problems associated with the prior art.

Determining the Height of Tools Mounted in the Spindle of a CNC Machine

In addition to the foregoing, in many cases it may be necessary to determine the height of a tool mounted in the spindle of the CNC machine, so that the tool can properly interface with the workpiece. More particularly, different tools may have different heights, so that the different tools project different distances down from the spindle of the CNC machine. Therefore it is frequently necessary to determine the height of a tool mounted in the spindle of the CNC machine, so that the tool can properly interface with the workpiece.

A common method for determining the height of the tool mounted in the spindle of the CNC machine involves hand-positioning a gauge block in the workpiece enclosure and then moving the tool to find the top of the gauge block. However, this can only be done with the door of the work enclosure open. If an operator has many tools to reference, it becomes a tedious and time-consuming process.

There are also electric height gauges that "light up" when the tool touches it. This still may require opening the door of the work enclosure to locate the button at the top of the electric height gauge so that, again, where there are many tools, the process is tedious and time-consuming.

Many CNC machines come with a very expensive option called a "tool pre-setter" which stores the tool height values electronically. This requires a program to do so.

As will hereinafter be discussed, the present invention also provides a novel tool height gauge for finding the height of tools mounted in the spindle of a CNC machine which overcomes the problems associated with the prior art.

SUMMARY OF THE INVENTION

The present invention comprises the provision and use of a new and improved static edge finder.

In one preferred form of the invention, there is provided a static edge finder comprising:
a body having a distal end and a proximal end;
an opening formed in the distal end of the body and extending toward the proximal end of the body, the opening terminating in a shoulder;
a slot formed in the body and communicating with the opening;
a plunger having a distal end and a proximal end, the proximal end of the plunger being disposed in the opening of the body and the distal end of the plunger extending out of the opening of the body;
a spring disposed between the proximal end of the plunger and shoulder of the opening; and
a retaining pin mounted to the plunger and extending through the slot.

And in one preferred form of the invention, there is provided a method for finding an edge of a workpiece loaded in a CNC machine, the method comprising:
providing a static edge finder comprising:
a body having a distal end and a proximal end;

an opening formed in the distal end of the body and extending toward the proximal end of the body, the opening terminating in a shoulder;

a slot formed in the body and communicating with the opening;

a plunger having a distal end and a proximal end, the proximal end of the plunger being disposed in the opening of the body and the distal end of the plunger extending out of the opening of the body;

a spring disposed between the proximal end of the plunger and shoulder of the opening; and a retaining pin mounted to the plunger and extending through the slot;

mounting the static edge finder to the spindle of the CNC machine;

positioning the distal end of the plunger against the top face of the workpiece;

lowering the spindle of the CNC machine so as to cause the proximal end of the plunger to move closer to the shoulder of the opening against the power of the spring;

moving the spindle of the CNC machine laterally until the distal end of the plunger moves off the top face of the workpiece and sits in engagement with the edge to be found; and storing the position of the spindle, and then adding or subtracting half the diameter of the distal end of the plunger so as to find the edge of the workpiece.

The present invention also comprises the provision and use of a new and improved tool height gauge.

In one preferred form of the invention, there is provided a tool height gauge comprising:

a body having a distal end and a proximal end;

an opening formed in the distal end of the body and extending toward the proximal end of the body, the opening terminating in a shoulder;

a slot formed in the body and communicating with the opening;

a plunger having a distal end and a proximal end, the proximal end of the plunger being disposed in the opening of the body and the distal end of the plunger extending out of the opening of the body;

a spring disposed between the proximal end of the plunger and shoulder of the opening; and a retaining pin mounted to the plunger and extending through the slot.

And in one preferred form of the invention, there is provided a method for finding the height of a tool loaded in a CNC machine, the method comprising:

providing a tool height gauge comprising:

a body having a distal end and a proximal end;

an opening formed in the distal end of the body and extending toward the proximal end of the body, the opening terminating in a shoulder;

a slot formed in the body and communicating with the opening;

a plunger having a distal end and a proximal end, the proximal end of the plunger being disposed in the opening of the body and the distal end of the plunger extending out of the opening of the body;

a spring disposed between the proximal end of the plunger and shoulder of the opening; and a retaining pin mounted to the plunger and extending through the slot;

mounting the tool to the spindle of the CNC machine;

moving the spindle of the CNC machine so as to cause the tool to engage the distal end of the plunger of the tool height gauge and cause the proximal end of the plunger to move closer to the shoulder of the opening against the power of the spring; and raising spindle of the CNC machine so that the distal end of the plunger slips beneath the tool and engages the distal end of the tool, whereby to find the height of the tool.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 5-7 are schematic views showing a new and improved static edge finder formed in accordance with the present invention;

FIGS. 17-22 are schematic views showing additional configurations for the plunger of the new and improved static edge finder of the present invention;

DETAILED DESCRIPTION OF THE PREFERRED EMBODIMENTS

Novel Static Edge Finder

Figure 1:
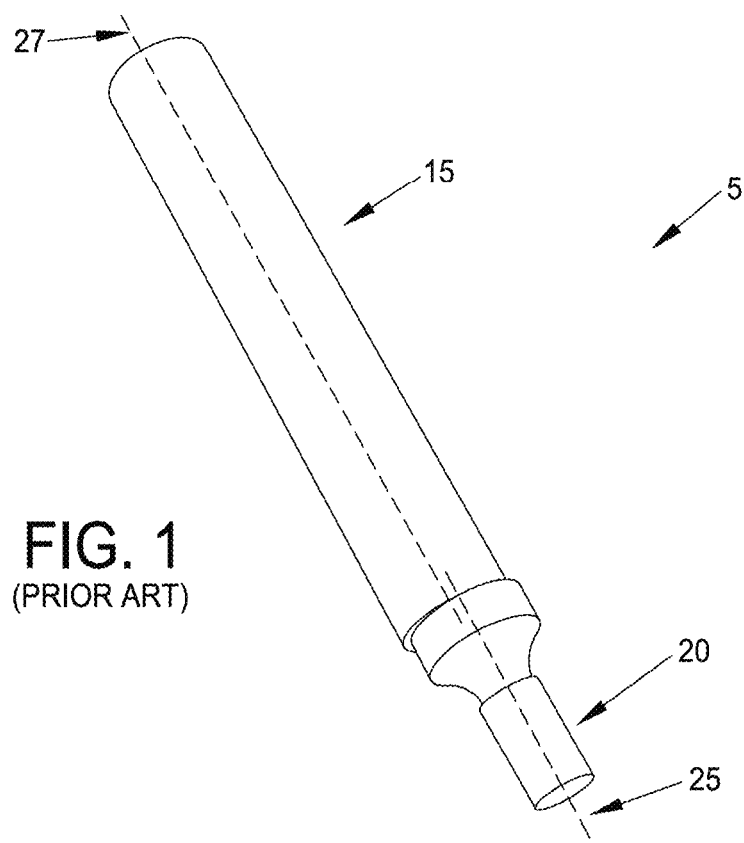
FIGS. 1 and 2 are schematic views showing a conventional edge finder.
Figure 2:
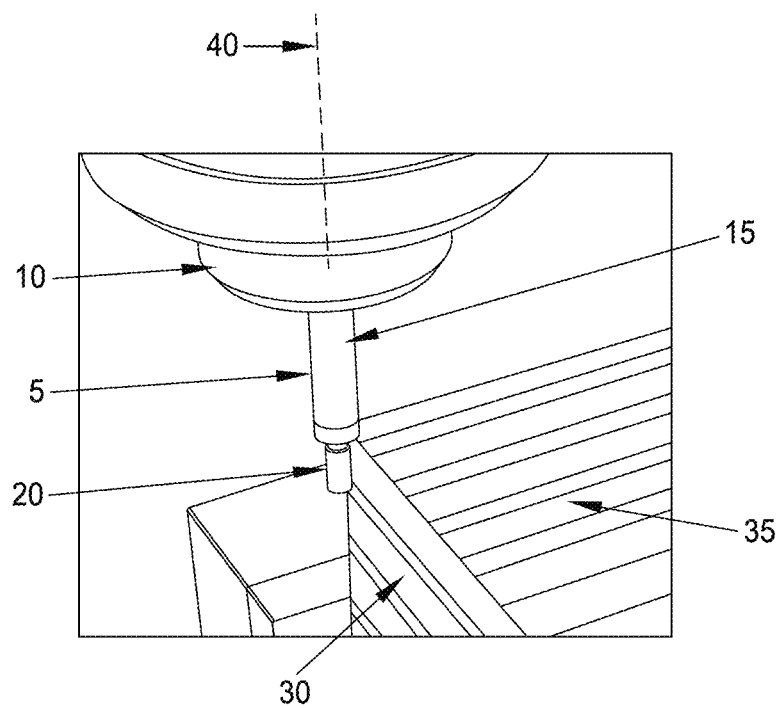
Figure 3:
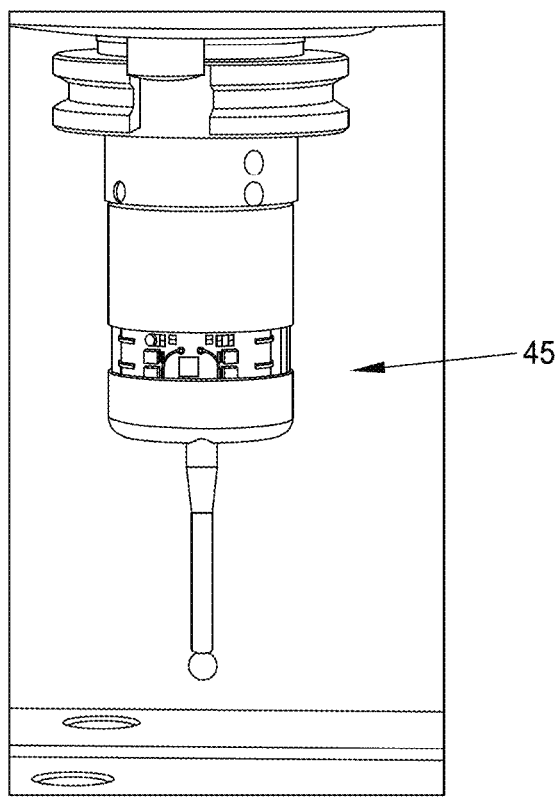
FIGS. 3 and 4 are schematic views showing a conventional spindle probe.
Figure 4:
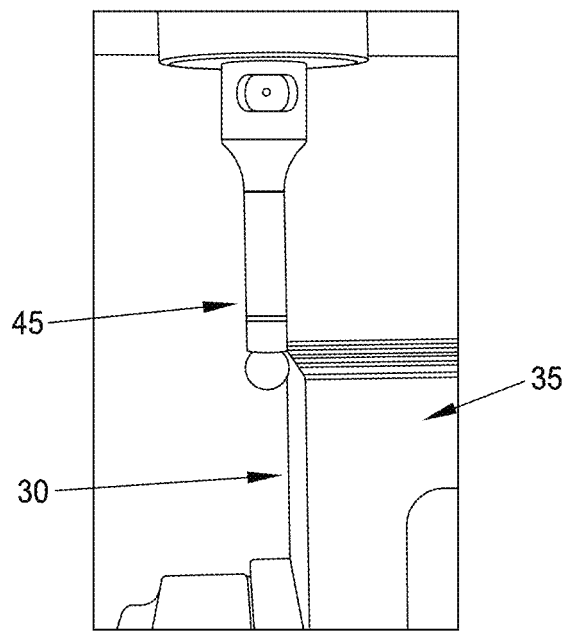
Figure 8:
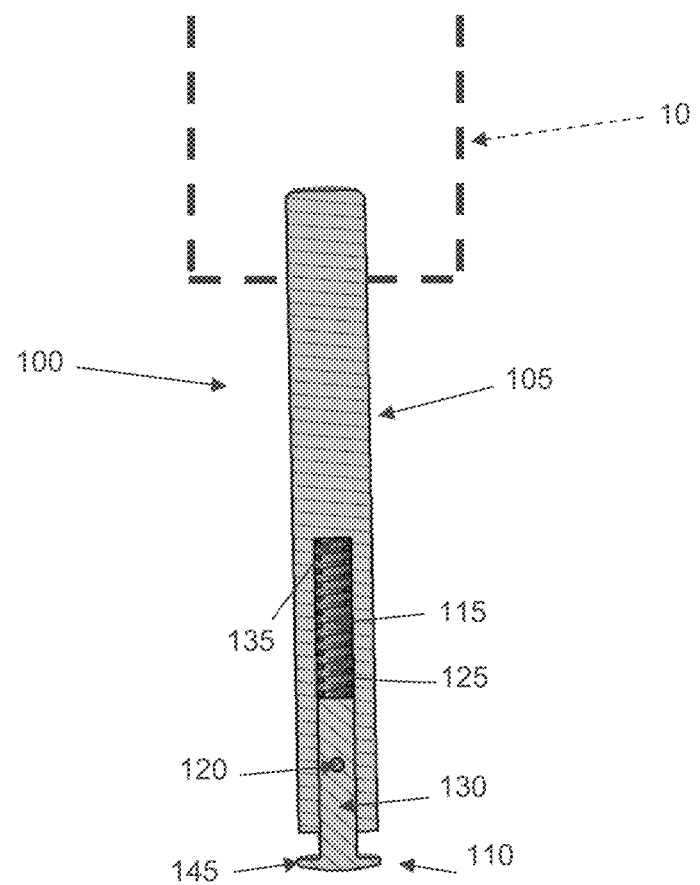
FIG. 8 is a schematic view showing the new and improved static edge finder of FIGS. 5-7 loaded in the spindle of a CNC machine.

The novel static edge finder of the present invention is used to locate the edge of a workpiece in a CNC machine with the spindle stationary (i.e., not spinning), which means that the static edge finder can be used with the door of the work enclosure open. Looking next at FIGS. 5-8, there is shown a static edge finder 100 formed in accordance with the present invention. Static edge finder 100 comprises a main body 105 which is held by the spindle 10 of the CNC machine, a plunger 110, a spring 115, and a retaining pin 120. The body 105 has a proximal end 121 and a distal end 122. The body 105 also has an opening 125 (e.g., a hole or bore) at the distal end 122 that is sized to closely slidingly receive the stem 130 of the plunger 110. The spring 115 sits between the stem 130 of the plunger 110 and a shoulder 135 in opening 125 so as to push the plunger away from the distal end 122 of the body 105. The body 105 also has a slot 140 which communicates with opening 125. The retaining pin 120 is mounted to the plunger 110 and extends through the slot 140 so as to provide a limited range of motion for the plunger 110. As a result of this construction, the plunger 110 is free to slide in and out of the body 105 to a limited extent, with the plunger 110 normally biased into an extended position by spring 115. Plunger 110 preferably includes an enlarged contact head 145 at the distal end of stem 130. Enlarged contact head 145 may terminate in a rounded convex configuration to facilitate engagement with a workpiece.

The novel static edge finder 100 is preferably used as follows.

Step 1. Put the proximal end 121 of the static edge finder 100 in the chuck or collet of the spindle 10 of the CNC machine. See FIG. 8.

Figure 9:
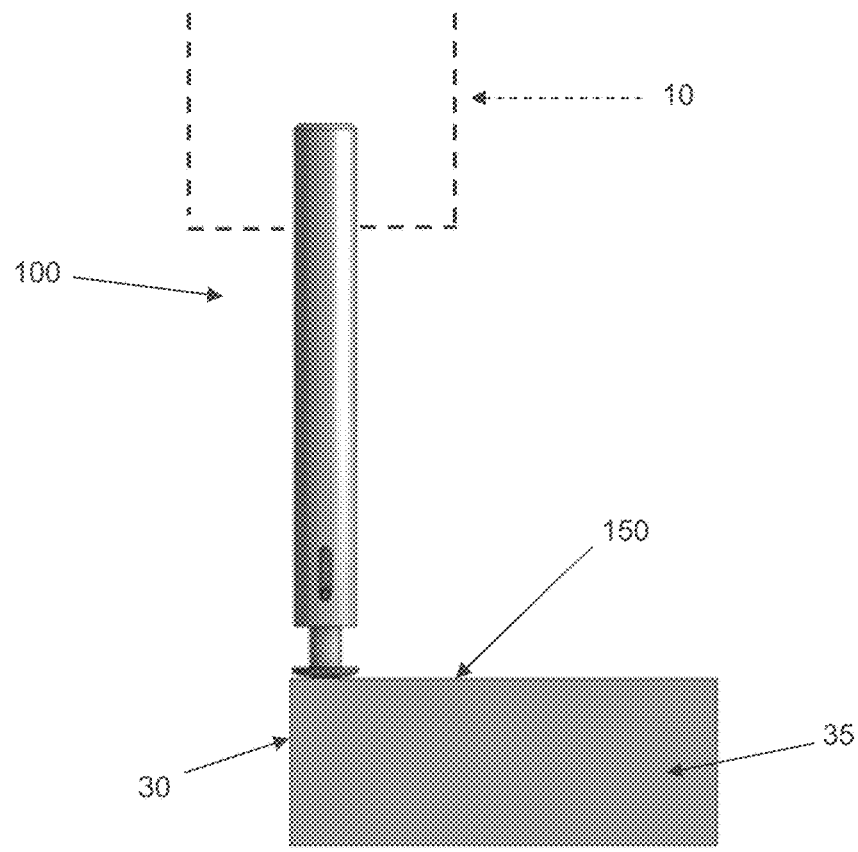
FIGS. 9-12 are schematic views showing the new and improved static edge finder of FIGS. 5-7 being used to find the edge of a workpiece.

Step 2. Using the "jog box" of the CNC machine, bring the plunger 110 into contact with the top face 150 of the workpiece 35 close to the desired edge 30 to be located. See FIG. 9. Note that this is done with the spindle "off", which means that the door of the work enclosure may be open, whereby to provide excellent visibility for the operator.

Figure 10:
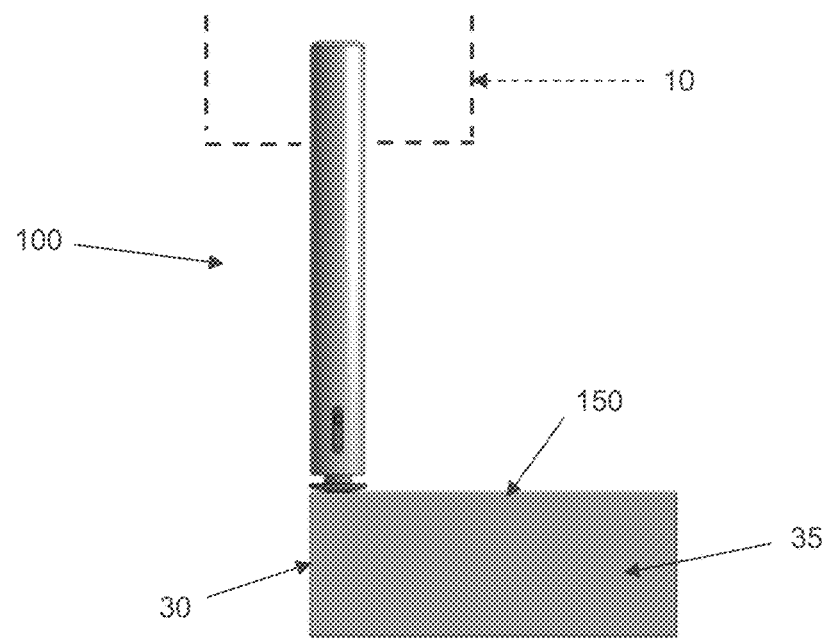

Step 3. Slowly lower the spindle to compress the spring 115 of the static edge finder 100 without "bottoming out" the retaining pin 120 in the slot 140 of the body 105. See FIG. 10. Again, this is done with the spindle 10 of the CNC machine "off", which means that the door of the work enclosure may be open, whereby to provide excellent visibility for the operator.

Figure 11:
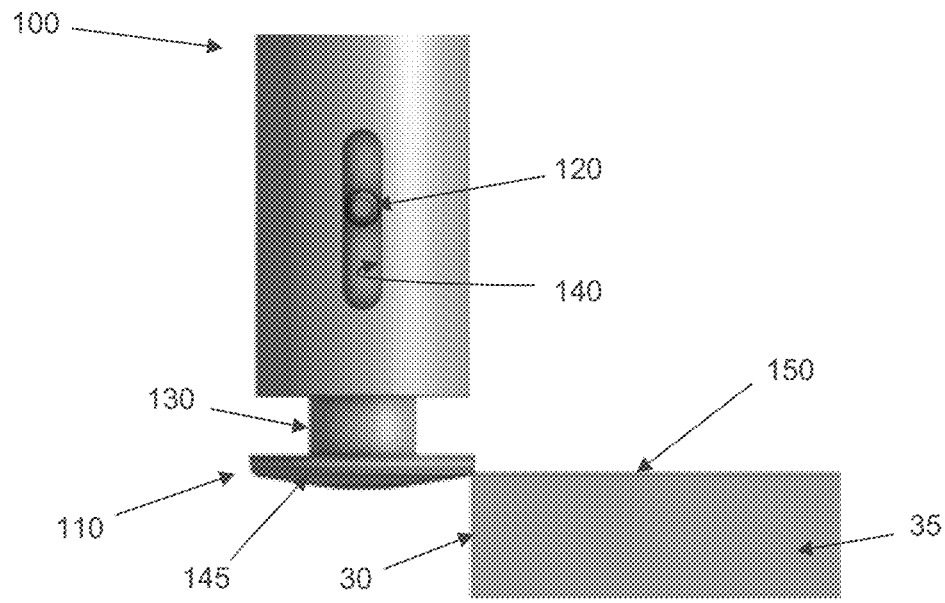

Step 4. Move the spindle of the CNC machine laterally toward the desired edge 30, whereby to move the static edge finder 100 laterally towards the desired edge 30, slowly watching for movement of the plunger 110. See FIG. 11. This lateral movement is done with the spindle "off", allowing the door of the work enclosure to be open.

Figure 12:
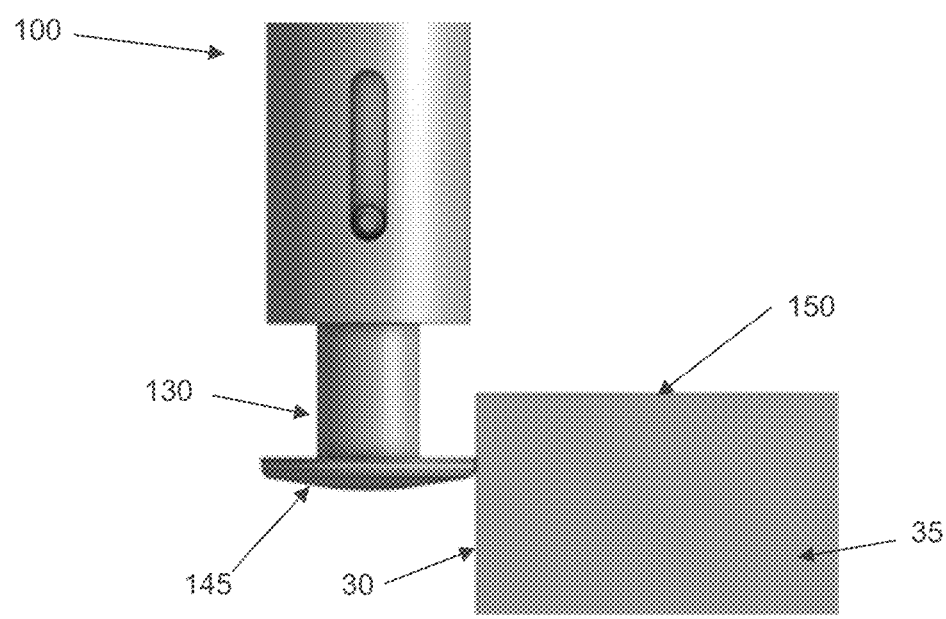

Step 5. When the edge of the plunger 110 snaps off the top face 150 of the workpiece 35, so that the plunger 110 sits in engagement with desired edge 30, store the position of the spindle, then add or subtract half the diameter of the plunger (depending on the direction) so as to identify the position of the edge 30 of the workpiece 35. See FIG. 12. Note that where plunger 110 comprises an enlarged contact head 145 at the end of stem 130, "half the diameter of the plunger" is half the diameter of the enlarged contact head 145.

Step 6. Repeat Steps 1-5 for all other remaining edges of the workpiece that need to be located for the various axes of the CNC machine.

Body 105

Figure 13:
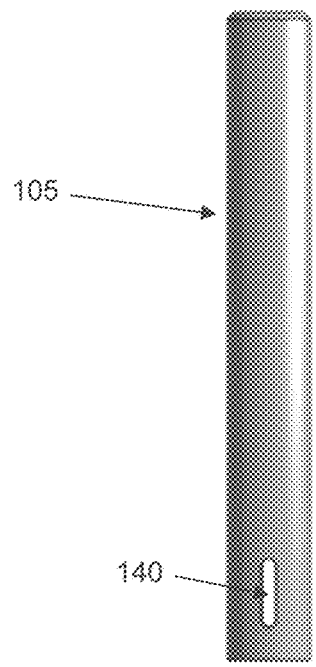
FIGS. 13-16 are schematic views showing various configurations for the body and/or plunger of the new and improved static edge finder of the present invention.
Figure 14:
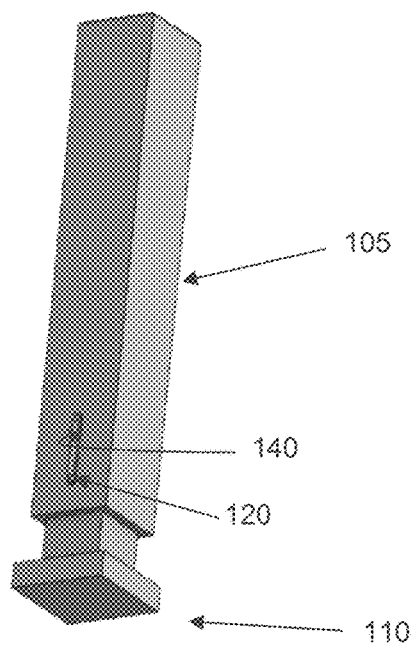
Figure 15:
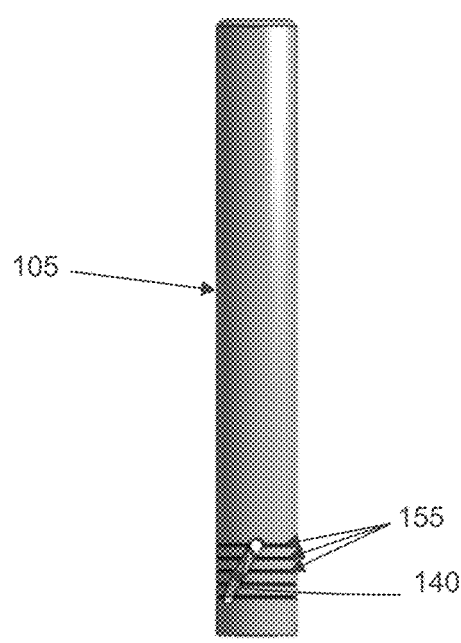
Figure 16:
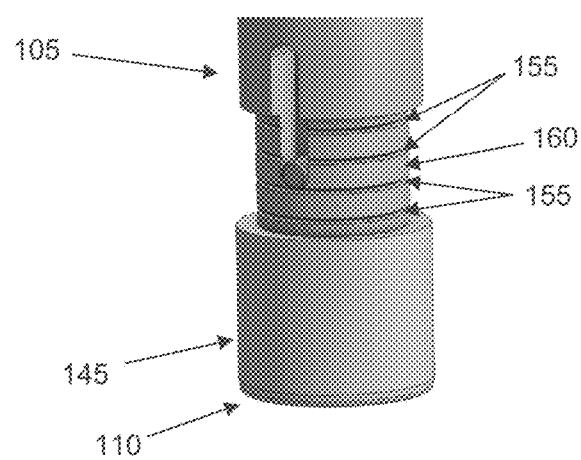

In one preferred form of the invention, the body 105 is round, but it could also be square or a hex, etc., depending on its use. See FIG. 13 (where body 105 is shown with a round configuration) and FIG. 14 (where body 105 is shown with a square configuration). The opening (or hole or bore) 125 of the body 105 houses the spring 115 and the stem 130 of the plunger 110. The slot 140 of the body 105, in conjunction with the retainer pin 120, is provided to limit the stroke of the plunger 110. Preferably, the slot 140 is set parallel to the longitudinal axis of the body 105. However, the slot 140 could be helical, which would accentuate the motion of the plunger 110, making it easier for the operator to detect when the plunger 110 is close to falling off the top face 150 of the workpiece. See FIG. 15. The body 105 can also have graduation markings 155 (FIG. 15) engraved onto it, or printed onto it, to give reference to the motion of the retainer pin 120 (and hence reference to the motion of the plunger 110). If desired, body 105 may have a reduced diameter 160 in the region of graduation markings 155, and/or a portion of enlarged contact head 145 of plunger 110 can ride over reduced diameter 160/graduation markings 155 so as to provide enhanced visibility of the position of plunger 110 relative to body 105. See FIG. 16.

Plunger 110

The plunger 110 comprises a stem (or shank) 130 and a hole 165 for receiving the retainer pin 120. Plunger 110 preferably also comprises an enlarged contact head 145 at the distal end of stem 130, with a shoulder 170 being disposed between the contact head 145 and the stem (or shank) 130.

The geometry of the plunger 110 can range from very simple to more complex, depending on the desired effect. By way of example but not limitation, the distal end of the contact head 145 can be flat or convex, the height of the contact head can be small or large, the shoulder of the contact head can be relatively close to, or relatively far from, the distalmost point of the contact head, etc. See FIGS. 17-22.

Design Variations

Figure 23:
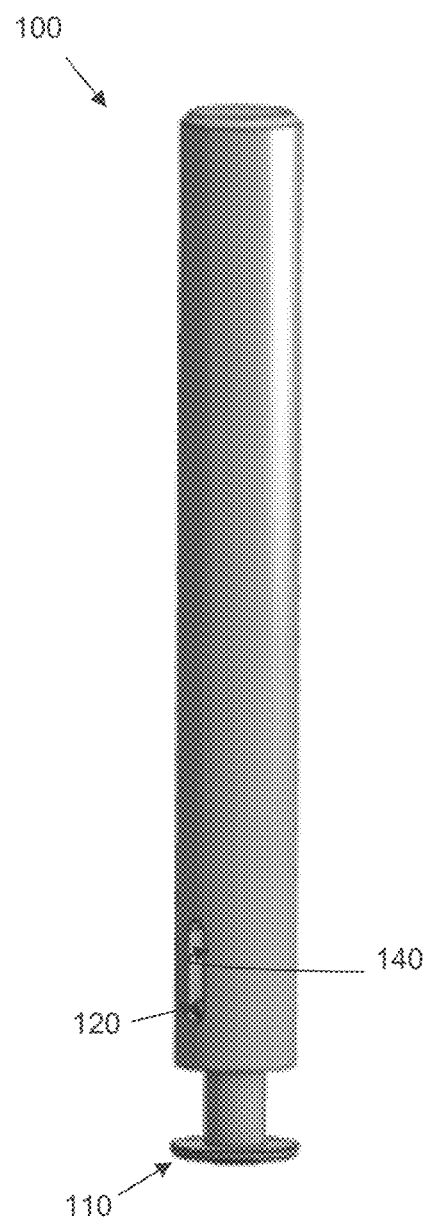
FIGS. 23-29 are schematic views showing still other configurations for the new and improved static edge finder of the present invention.

The simplest and preferred construction for the body 105 is a straight slot 140 and no graduation markings 155. See FIG. 23.

Figure 24:
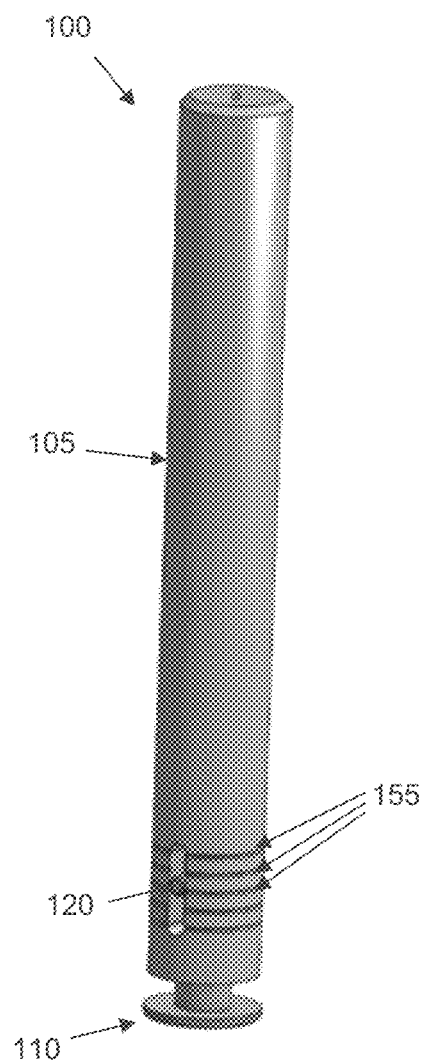
Figure 25:
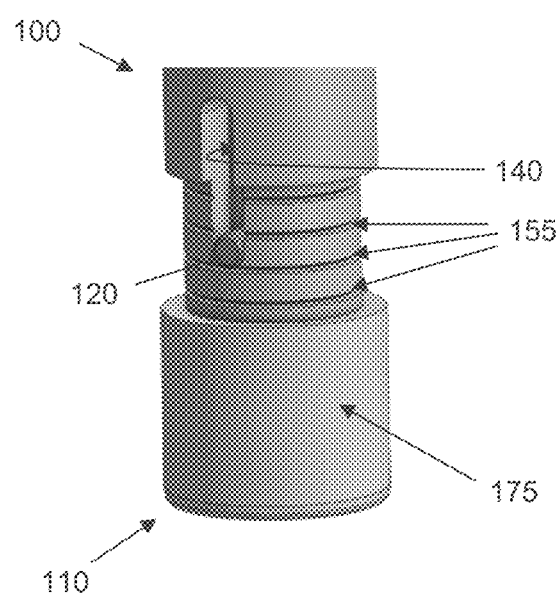

In another form of the invention, the body 105 can be provided with graduation markings 155 (engraved or printed, including colored printing) as shown in FIG. 24, and the plunger 110 can be provided with a skirt 175 (acting as the enlarged contact head 145) as shown in FIG. 25, so as to give the operator an indication that the plunger is about to, or has, fallen off the top face 150 of the workpiece 35. More particularly, at the top position of the graduation markings 155 of the body 105, there may be a red ring; at the graduation marking of the body which is indicative of the plunger being close to falling off the top face 150 of the workpiece, the ring might be a yellow ring; and the graduation marking reflective of when the plunger drops off the top face 150 of the workpiece, a green ring on the graduation marking of the body would be revealed. The colors may vary depending on the meaning desired.

Figure 26:
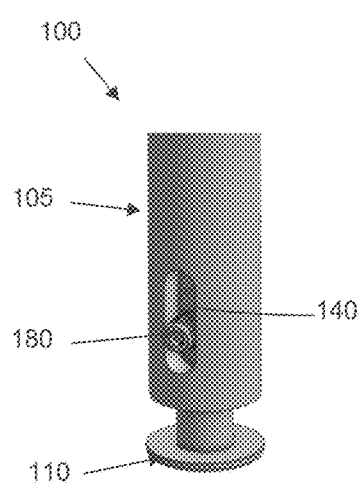
Figure 27:
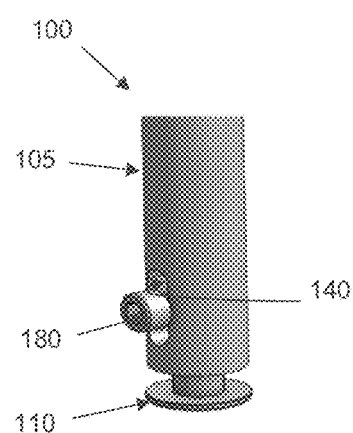
Figure 28:
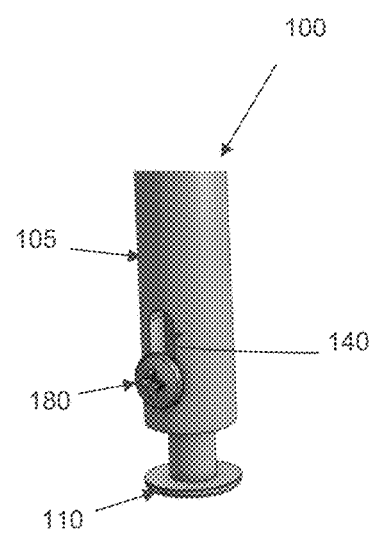

And, if desired, threaded fasteners 180 can be used in place of the retainer pin 120 to retain the plunger in the body. See FIGS. 26-28.

Figure 29:
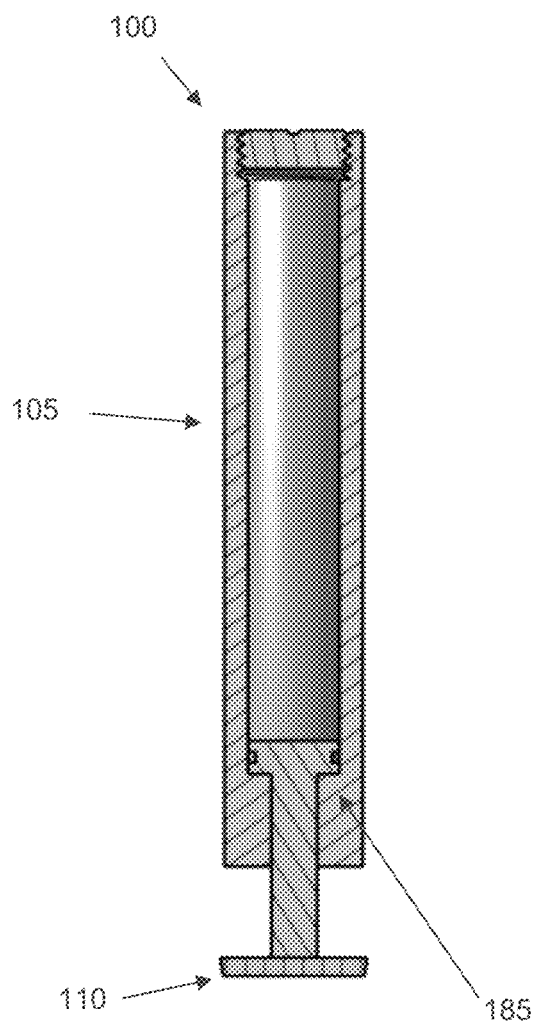

Furthermore, if desired, a gas piston mechanism 180 may be used in place of spring 115 to bias the plunger 110 distally away from the end of the body. See, for example, FIG. 29.

Novel Tool Height Gauge

The novel tool height gauge of the present invention is used to determine the height of a tool mounted in the spindle of a CNC machine with the spindle stationary (i.e., not spinning), which means that the novel tool height gauge can be used with the door of the work enclosure open.

Figure 30:
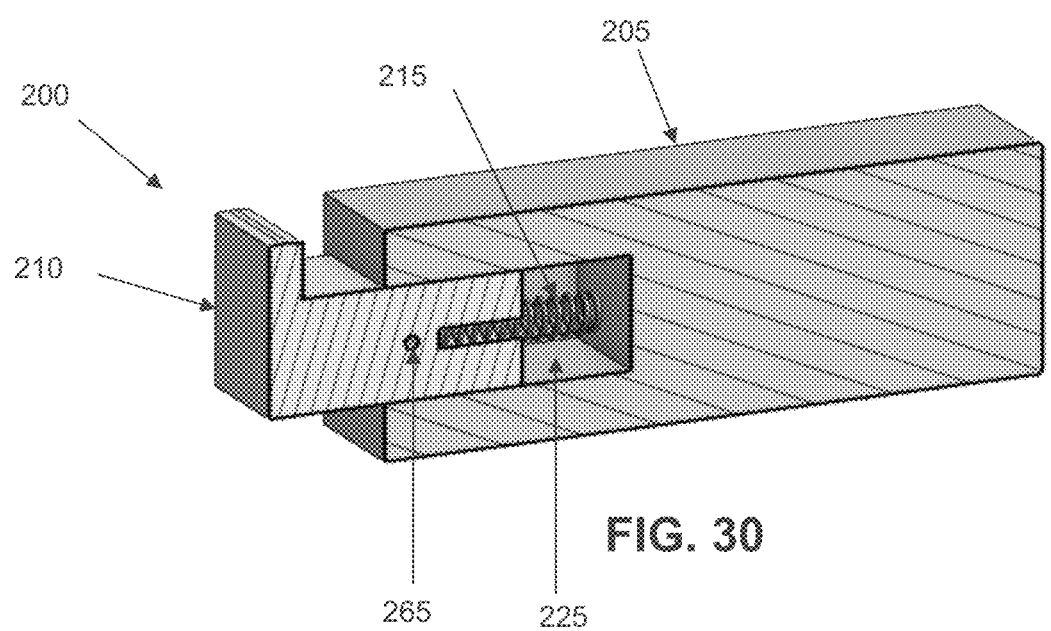
FIG. 30 is a schematic view showing a new and improved tool height gauge formed in accordance with the present invention.

More particularly, and looking next at FIG. 30, there is shown a novel tool height gauge 200 formed in accordance with the present invention. Novel tool height gauge 200 comprises a body 205 (generally analogous to the body 105 of the static edge finder 100), an opening 225 formed in the body of the tool height gauge 200 (generally analogous to the opening 125 in the body of the static edge finder 100), a plunger 210 which is spring-biased (via spring 215) outwardly from the opening 225 in the body of the tool height gauge (generally analogous to the plunger 110 and spring 125 in the body 105 of the static edge finder 100), a slot 240 (FIG. 31) in the body of the tool height gauge (generally analogous to the slot 140 in the body of the static edge finder 100), and a retainer pin 220 (FIG. 31) which is fixed to the plunger (via a hole 265) and which extends through the slot 240 in the body of the tool height gauge 200 (in a manner generally analogous to how the retainer pin 120 of the static edge finder 100 extends through the slot 140 in the body of the static edge finder).

Figure 31:
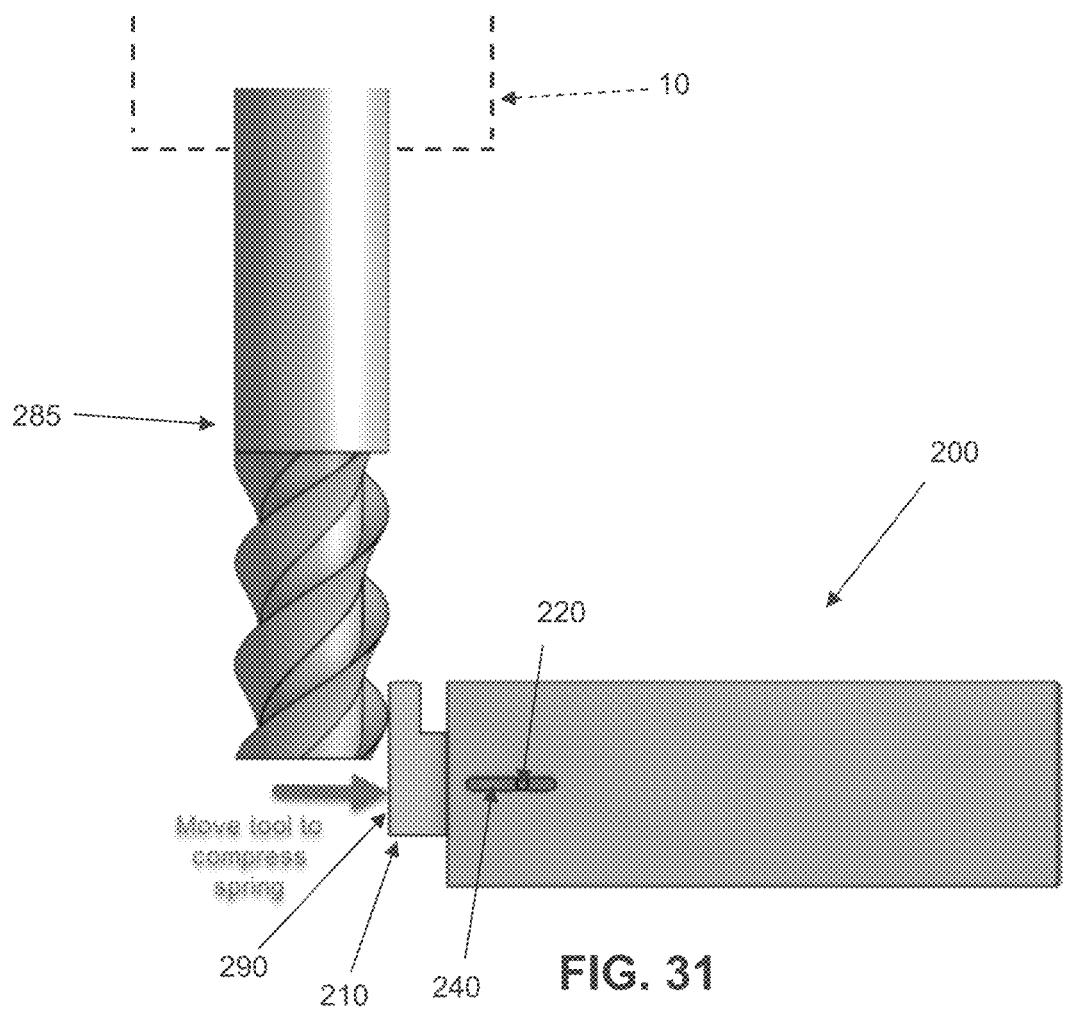
FIGS. 31-33 are schematic views showing the new and improved tool height gauge of FIG. 30 being used to find the height of a tool loaded into a CNC machine.
Figure 32:
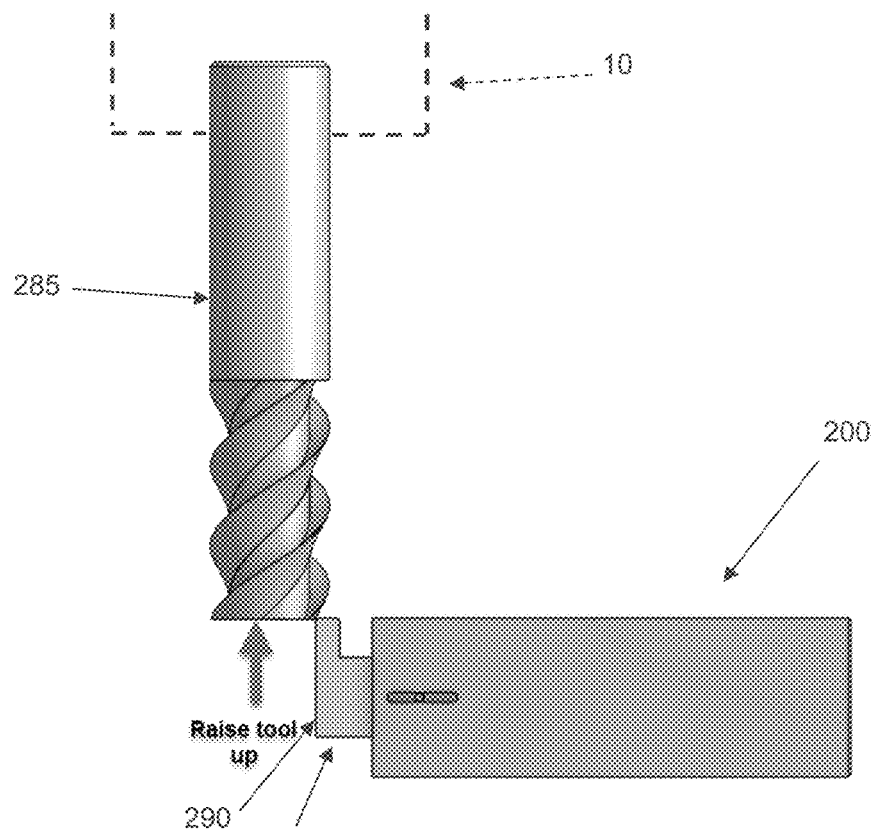
Figure 33:
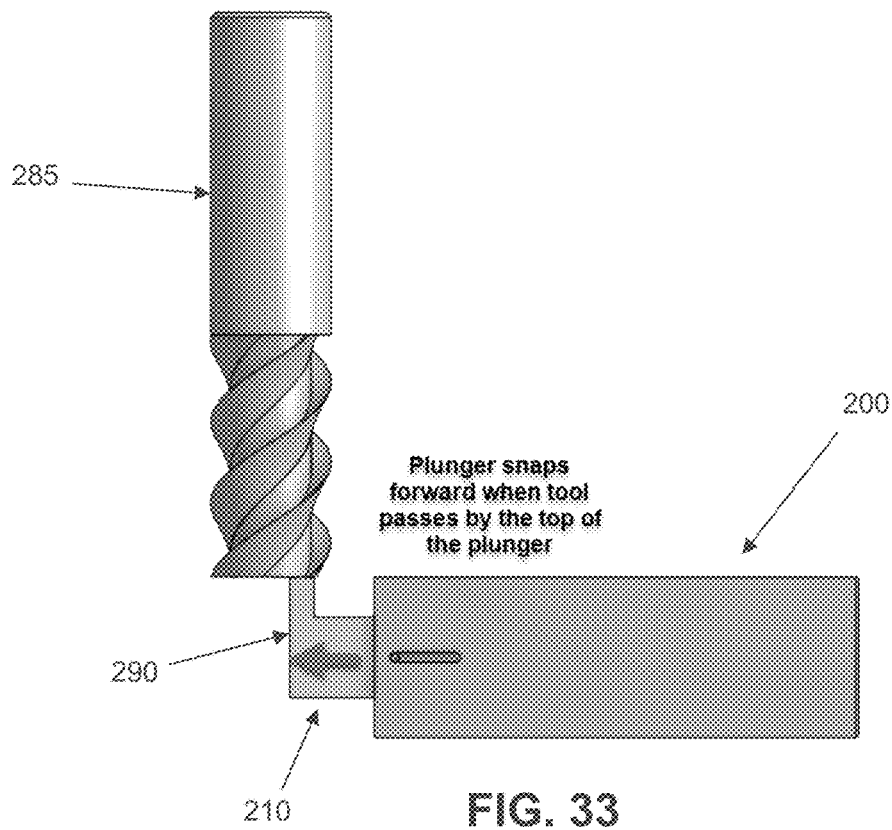

The novel tool height gauge allows the operator to acquire the reference height of a tool 285 mounted in the spindle 10 of a CNC machine with the door of the work enclosure closed by moving the tool 285 into engagement with the distal face 290 of the plunger 210 of the tool height gauge 200 and then shifting the tool 285 laterally toward body 205 so as to force the plunger 210 laterally and compress the spring 215 (see FIG. 31). Next, the operator will raise the tool 285 up (see FIG. 32) until the plunger 210 slips underneath the tool 285 (see FIG. 33). This will indicate to the operator that the tool 285 is positioned at a known height, whereupon the value is stored in the control of the CNC machine by the operator.

Significantly, these operations can all be undertaken with the door open or closed, so that a plurality of tools can have their heights measured without requiring the door to be opened or closed between tool height measurements. This is an important feature, since CNC machines often use 10-50 (or more) tools in a single workpiece run.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A method for finding an edge of a workpiece loaded in a CNC machine, the method comprising:
   providing a static edge finder comprising:
      a body having a distal end and a proximal end;
      an opening formed in the distal end of the body and extending toward the proximal end of the body, the opening terminating in a shoulder;
      a slot formed in the body and communicating with the opening;
      a plunger having a distal end and a proximal end, the proximal end of the plunger being disposed in the opening of the body and the distal end of the plunger extending out of the opening of the body;
      a spring disposed between the proximal end of the plunger and shoulder of the opening; and
      a retaining pin mounted to the plunger and extending through the slot;
   mounting the static edge finder to a spindle of the CNC machine;
   positioning the distal end of the plunger against the top face of the workpiece;
   lowering the spindle of the CNC machine so as to cause the proximal end of the plunger to move closer to the shoulder of the opening against the power of the spring;
   moving the spindle of the CNC machine laterally until the distal end of the plunger moves off the top face of the workpiece and sits in engagement with the edge to be found; and
   storing the position of the spindle, and then adding or subtracting half the diameter of the distal end of the plunger from the center axis of the spindle so as to find the edge of the workpiece.

2. A method according to claim 1 wherein the plunger comprises an enlarged contact head.

3. A method according to claim 2 wherein the enlarged contact head comprises a rounded convex configuration.

4. A method according to claim 2 wherein the enlarged contact head comprises a flat configuration.

5. A method according to claim 1 wherein the body comprises a round configuration.

6. A method according to claim 1 wherein the body comprises a square configuration.

7. A method according to claim 1 wherein the slot is set parallel to the longitudinal axis of the body.

8. A method according to claim 1 wherein the slot comprises a helical configuration.

9. A method according to claim 1 wherein the body comprises graduation markings.

10. A method according to claim 9 wherein the body comprises a reduced diameter in the region of the graduation markings.

11. A method according to claim 10 wherein a portion of the plunger is configured to ride over the reduced diameter.

12. A method for finding the height of a tool loaded in a CNC machine, the method comprising:
    providing a tool height gauge comprising:
       a body having a distal end and a proximal end;
       an opening formed in the distal end of the body and extending toward the proximal end of the body, the opening terminating in a shoulder;
       a slot formed in the body and communicating with the opening;
       a plunger having a distal end and a proximal end, the proximal end of the plunger being disposed in the opening of the body and the distal end of the plunger extending out of the opening of the body;
       a spring disposed between the proximal end of the plunger and the shoulder of the opening; and
       a retaining pin mounted to the plunger and extending through the slot;
    mounting the tool to a spindle of the CNC machine;
       moving the spindle of the CNC machine so as to cause the tool to engage the distal end of the plunger of the tool height gauge and cause the proximal end of the plunger to move closer to the shoulder of the opening against the power of the spring; and
       raising the spindle of the CNC machine so that the distal end of the plunger slips beneath the tool and engages the distal end of the tool, whereby to find the height of the tool.

13. A method according to claim 12 wherein the body comprises a square configuration.

14. A method according to claim 12 wherein the slot comprises a rounded configuration.

15. A method according to claim 12 wherein the slot is set parallel to the longitudinal axis of the body.

16. A method according to claim 12 wherein the slot comprises a helical configuration.

* * * * *